United States Patent [19]

Beam et al.

[11] Patent Number: 4,566,050

[45] Date of Patent: Jan. 21, 1986

[54] SKEW INSENSITIVE MAGNETIC READ HEAD

[75] Inventors: David L. Beam, Cary; Glen P. Double, Charlotte, both of N.C.

[73] Assignee: International Business Machines Corp. (IBM), Armonk, N.Y.

[21] Appl. No.: 454,916

[22] Filed: Dec. 30, 1982

[51] Int. Cl.[4] .................. G11B 5/127; G11B 5/33; G11B 5/187

[52] U.S. Cl. .................................. 360/113; 360/122; 338/32 R; 324/252

[58] Field of Search ............... 360/113, 115, 117, 122, 360/125, 126, 76; 338/32 R; 324/252; 365/8, 158

[56] References Cited

U.S. PATENT DOCUMENTS

| | | | |
|---|---|---|---|
| 3,848,217 | 11/1974 | Lazzari | 338/32 R |
| 3,881,190 | 4/1975 | Brock et al. | 360/125 |
| 3,921,217 | 11/1975 | Thompson | 360/113 |
| 3,921,218 | 11/1975 | Kayser | 360/113 |
| 4,100,583 | 7/1978 | Koel et al. | 360/113 |
| 4,296,377 | 10/1981 | Ohkubo | 338/32 R |
| 4,477,794 | 10/1984 | Nomura et al. | 365/158 |

FOREIGN PATENT DOCUMENTS

| | | | |
|---|---|---|---|
| 52-55513 | 5/1977 | Japan | 360/119 |
| 57-172525 | 10/1982 | Japan | 360/125 |

OTHER PUBLICATIONS

IBM Journal of Research and Development, vol. 18, No. 6, pp. 541–546, Nov. 1974, "Hand-Held Magnetoresistive Transducer", by Bajorek et al.

Primary Examiner—Stuart N. Hecker
Assistant Examiner—Alfonso Garcia
Attorney, Agent, or Firm—Bell, Seltzer, Park & Gibson

[57] ABSTRACT

In hand-held magnetic readers, it is desirable that the magnetic read head be able to detect flux transitions on the surface of a magnetic media without requiring that the head have a specific orientation to the media. The present invention provides such a read head in which a thin planar magnetoresistive element is mounted so as to be perpendicular to the surface of the media. A thick yoke which is coplanar with the element provides a pole face adjacent the media surface which is sufficently wide as to extend over adjacent flux transitions when the plane of the element is skewed with respect to the flux transitions. A further pole face of the yoke is adjacent the edge of the element remote from the surface.

10 Claims, 7 Drawing Figures

SKEW INSENSITIVE MAGNETIC READ HEAD

This invention relates to magnetic sensing devices for reading information from magnetically recorded media and, more particularly, such devices that use a magnetoresistive element as the sensor in handscanner applications.

The use of magnetoresistive elements for reading flux changes from a magnetic media such as magnetic tape is well known. The article entitled "Hand-Held Magnetoresistive Transducer" by C. H. Bajorek et al published in the November 1974 issue of the IBM Journal of Research and Development, pages 541 to 546, describes the design of a transducer having such a magnetoresistive element. With the transducer described in the Bajorek et al article, the magnetoresistive element produces a maximum signal when it is substantially aligned with the magnetic transitions as shown in FIG. 1 of the article and a lesser signal as the element skews out of alignment as can happen with hand-held scanning devices. The magnetoresistive element is situated very near the surface of the magnetic tape or stripe so as to improve resolution and react effectively with the field from flux transitions. The useful life of the transducer is a direct function of the distance or "flying height" between the magnetoresistive element and the tape contact wear surface.

U.S. Pat. No. 3,921,217 to David A. Thompson, issued Nov. 18, 1975 to the assignee of the present application, describes a magnetic transducer which uses a magnetoresistive element surrounded by a magnetic flux conducting yoke that allows the element to be located further from the wear surface. In the Thompson device, the magnetoresistive element is located as a bridge between two portions of a magnetically permeable middle leg of a three-legged yoke. The lower portion of the middle leg is adjacent a moving tape surface. This middle leg and the two outer legs serve to provide an efficient path for coupling the magnetic flux from a sensed transition through the magnetoresistive element to adjacent transitions. This efficient path enables the magnetoresistive element to be located more remotely from the surface of the tape. At the same time, the outer legs shield the element from outlying transitions whose magnetic fields would interfere with the field from the sensed transition. With this structure, Thompson minimizes wear on the magnetoresistive element by situating it remotely from the moving tape surface and improves resolution by providing an efficient path to adjacent transitions and by shielding the magnetoresistive element from flux changes occurring outside the sensing region. However, the sensor output is extremely sensitive to skew or azimuthal variations.

The Thompson, and Bajorek et al devices are very sensitive to angular misalignment of the magnetoresistive element with respect to the flux patterns being read. It is an object of the present invention to provide an output signal level which is independent of the angular orientation of the magnetoresistive element with respect to the flux transitions.

We have discovered that the disadvantages of the prior art can be avoided while retaining responsiveness over a broad range of flux transition densities. By providing a planar magnetoresistive element substantially surrounded by a permeable magnetic yoke in the same, or a closely adjacent plane to the magnetoresistive element, a relatively uniform signal response can be obtained regardless of angular misalignment of the plane of the magnetoresistive element with the flux transitions. When the magnetoresistive element is aligned with the flux transitions, it is efficiently coupled without the yoke, as in the prior art. To compensate for decoupling that comes from angular misalignment, the magnetic yoke extends over the next adjacent flux transitions to guide flux to the plane of the magnetoresistive element when the magnetoresistive element is skewed with respect to the flux transition being sensed. The configuration of this novel structure assures that, if the device is rotated about an axis perpendicular to the magnetic tape, adequate coupling between the magnetoresistive element and the sensed transition on the tape will be maintained. In other words, this yoke configuration provides for efficient coupling of the flux through the plane of the magnetoresistive element as the magnetoresistive element itself is skewed with respect to the flux transitions.

The present invention provides an improved magnetic reader for detecting binary flux transitions recorded on the surface of a magnetic media. The read head of the reader has a thin substantially planar magnetoresistive element mounted within the head such that the element is perpendicular to the surface of the media when the head is detecting transitions. A relatively thick yoke is coplanar with the element. The yoke has at least one pole face adjacent the surface and wide enough to extend over flux transitions adjacent to a flux transition beneath the element when the plane of the element is skewed with respect to the flux transitions. A further pole face of the yoke is positioned adjacent the edge of the element most distant from the surface. Conductor means is connected to two separate points on the element so as to enable detection of changes in resistance within the element.

BRIEF DESCRIPTION OF THE DRAWINGS

The details of a preferred embodiment of our invention will be described in connection with the accompanying drawings in which, FIG. 1 is a schematic illustration of the prior art magnetoresistive sensing device when aligned with the flux transitions of a typical record stripe.

FIG. 1a shows an enlarged fragmentary view of a portion of FIG. 1.

FIGS. 1 and 2 of the drawing show schematically the operation of a prior art magnetoresistive sensing head as is described in the Bajorek et al article. The head includes a magnetoresistive element 10. The head is normally mounted in a structure within a hand held wand or reader such as is described in the Bajorek et al article whereby the head can be drawn across the surface of the magnetic tape or stripe 11 by hand. The structure includes a gimbal mount which holds the plane of the sensor head perpendicular to the surface of the tape 11 as is required to produce the best response. The interaction of flux from a transition 12 with element 10 lowers the electrical resistance of magnetoresistive element 10 and thus produces a voltage drop that is detectable, for example, by voltage sensor 13.

As better shown in FIG. 1A, the prior art magnetoresistive element 10 is disposed parallel to the flux transitions 12 on the magnetic tape 11 so that the maximum coupling occurs between the magnetoresistive element 10 and the flux transition 12. Turning to FIG. 2, it is seen that as the magnetoresistive sensor element 10 is rotated or skewed away from the position of alignment with the magnetic flux transitions 12, progressively less flux passes through the planar magnetoresistive element 10. As less flux is coupled through the magnetoresistive element 10, the element becomes less responsive to flux transitions 12 on the magnetic tape 11 and more sensitive to flux variations because there is no longer sufficient flux to saturate the element.

Figure 3:
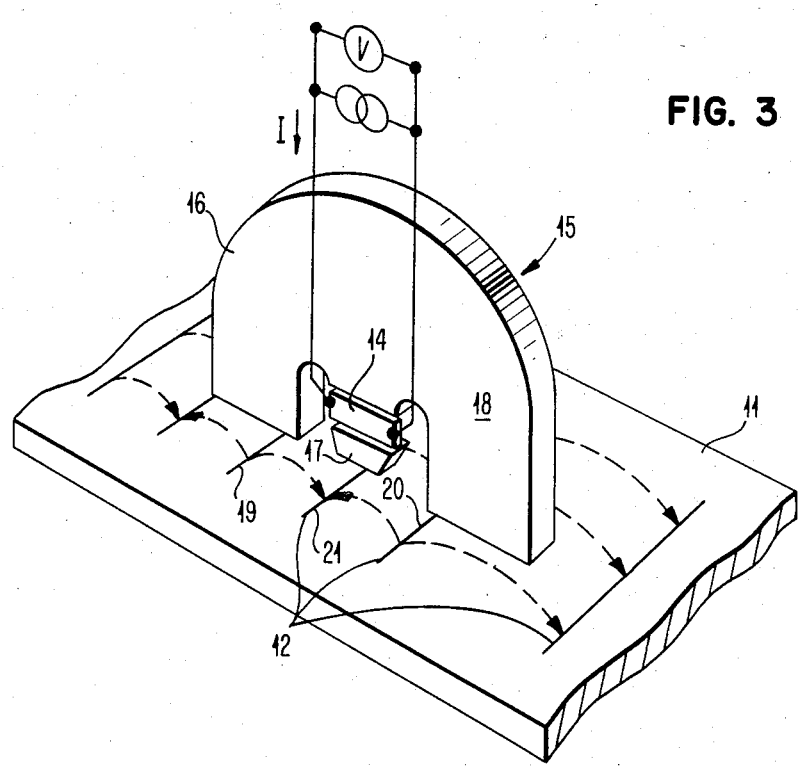
FIG. 3 is a conceptual illustration of the mangetoresistive sensing device in accordance with this present invention, showing the maximum of 90 degrees misalignment with the flux transitions.
Figure 4:
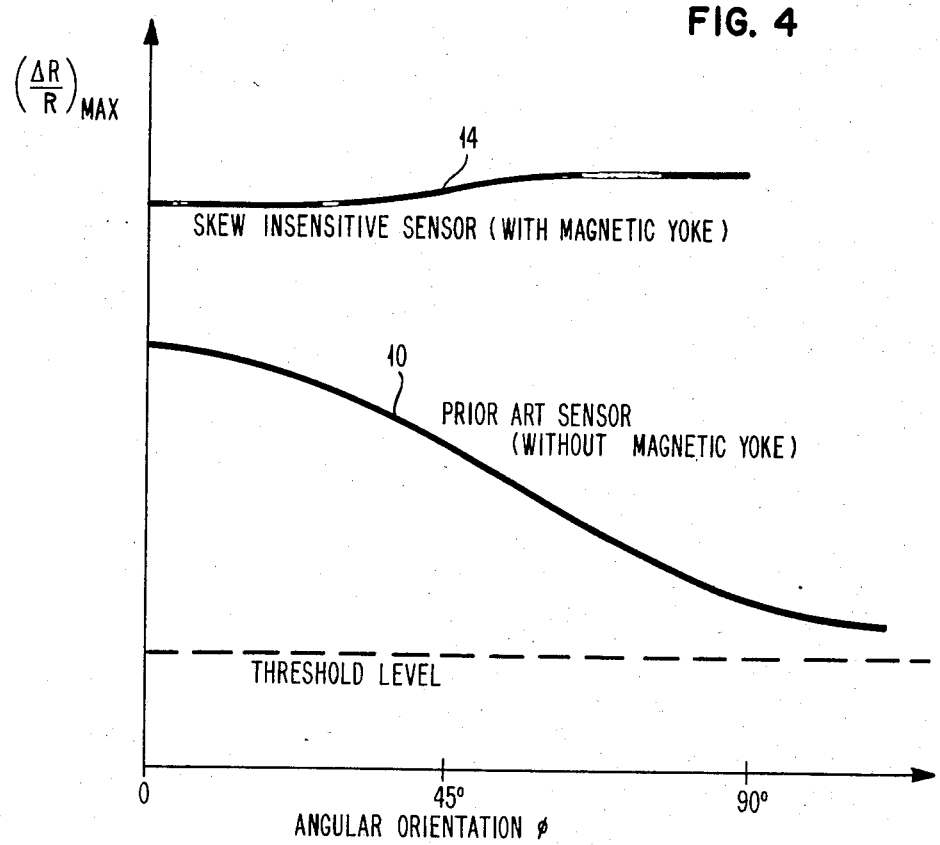

The present invention overcomes the deficiencies and limitations of the prior art by providing a magnetoresistive element 14 with a substantially coplanar magnetically permeable yoke 15 as shown conceptually in FIG. 3.

The yoke 15 consists of highly permeable magnetic material having three legs 16, 17 and 18. The yoke may be of any material which has high magnetic permeability, low coercivity, and low Barkhausen noise. The magnetoresistive element 14 is interposed between two portions of the center leg 17.

Flux transitions occur under the faces of the legs 16, 17 and 18, with each face providing a flux transmission path between poles associated with adjacent transitions through the magnetoresistive element 14. The magnetoresistive element 14 is disposed substantially coplanar with the yoke so that the flux flowing through the magnetoresistive element 14 is optimal. The legs of the yoke material must be separated by a sufficient amount to ensure that the flux passes through the legs of the magnetic yoke to the magnetoresistive element 14 and does not pass directly from one leg of the yoke directly to an adjacent leg.

Figure 4:
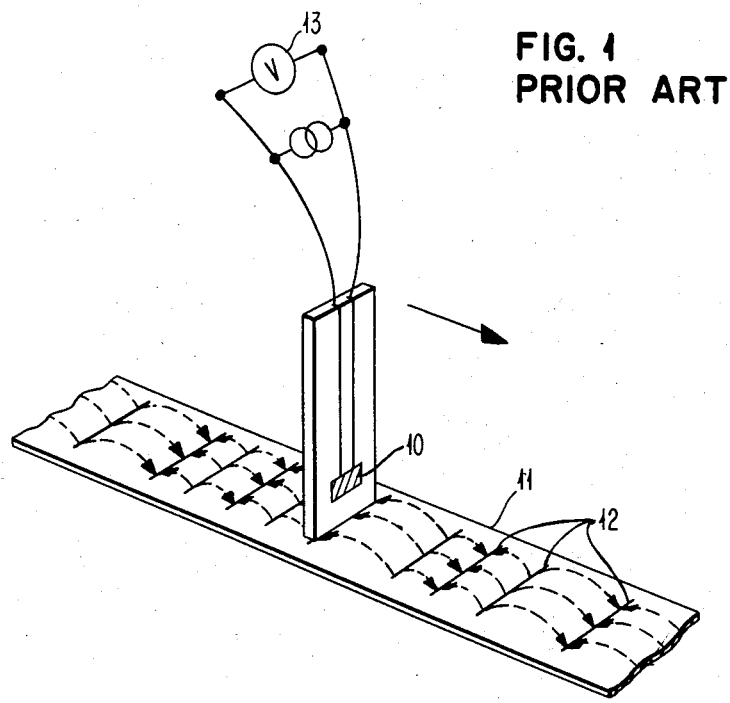
FIG. 4 shows a graphical comparison of the response characteristics of our magnetoresistive sensing device and the prior art sensing device as the misalignment or skew angle changes.
Figure 4A:
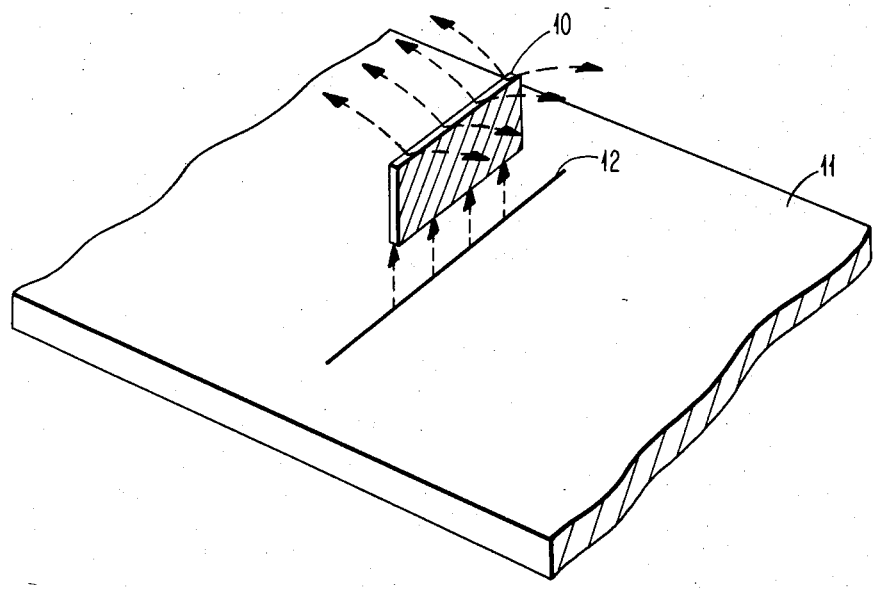
Figure 2:
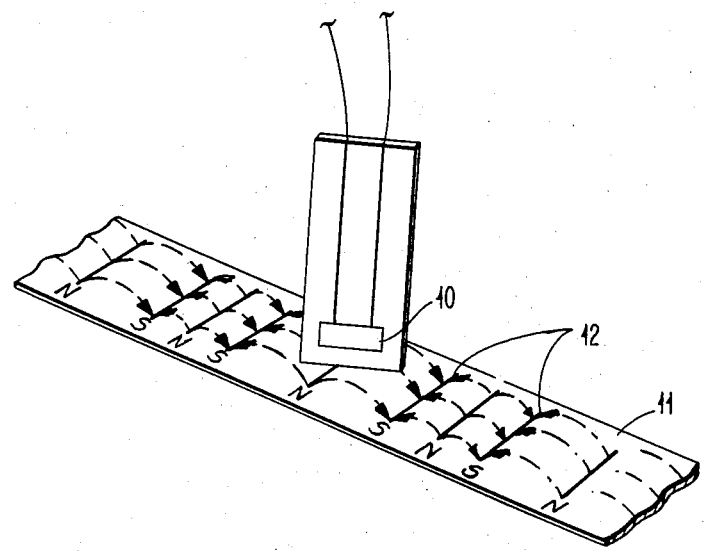
FIG. 2 shows the prior art magnetoresistive sensor device when skewed or misaligned with the flux transitions.

In the orientation of FIG. 3, the outer yoke legs 16 and 18 extend over adjacent flux transitions 19 and 20 to complete an efficient flux path or coupling between the magnetic poles represented by these transitions and the transition 21 immediately below the magnetoresistive element 14. With this arrangement the sensing device can be oriented 90 degrees out of alignment with the transitions 12 and a good signal can still be obtained. In fact, the sensing signal level can be made relatively constant over the entire range of head/transition skew angle orientations as is shown in FIG. 4. FIG. 4 shows that the relative change in output signal of the magnetoresistive element 14 remains substantially constant over the whole range of angular orientation with the novel construction disclosed herein, whereas the relative change in resistance drops substantially with increasing angular orientation of the prior art device.

The width of external legs 16 and 18 is made wide so that the legs will stay coupled to transitions 19 and 20, respectively, when the skew angle decreases from 90 degrees.

Figure 5:
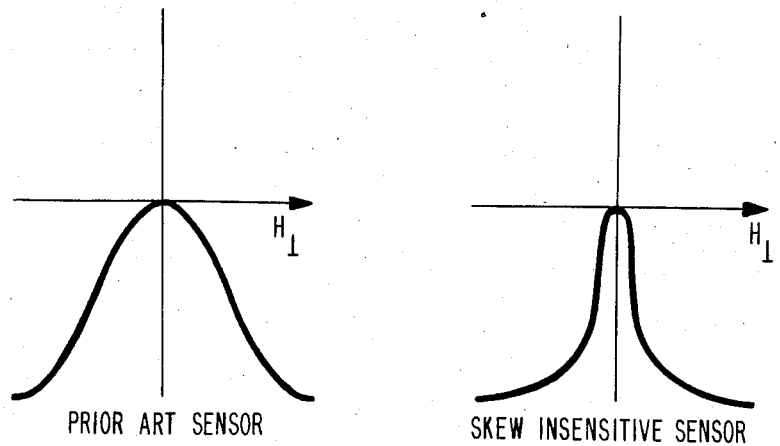
FIG. 5 compares the prior art device response characteristics to the invented device response characteristic.

The shape of the sensor response (percentage change in resistance $\Delta R/R$) as a function of vertical magnetic field is shown in FIG. 5 both for the prior art sensor without the planar magnetic yoke material and the new sensor having the magnetic yoke material as described herein. It is readily apparent from these two comparisons that the sensor having the magnetic yoke is significantly more sensitive to small fields. This more sensitive signal response enables the magnetoresistive sensor to sense more closely spaced transitions or transitions at the same spacing but at a greater distance from the tape surface than is possible with the prior art sensor. This improvement results from the more efficient flux path provided by our yoke in all orientations and by the yoke decreasing the demagnetizing field across the magnetoresistive device.

Figure 6:
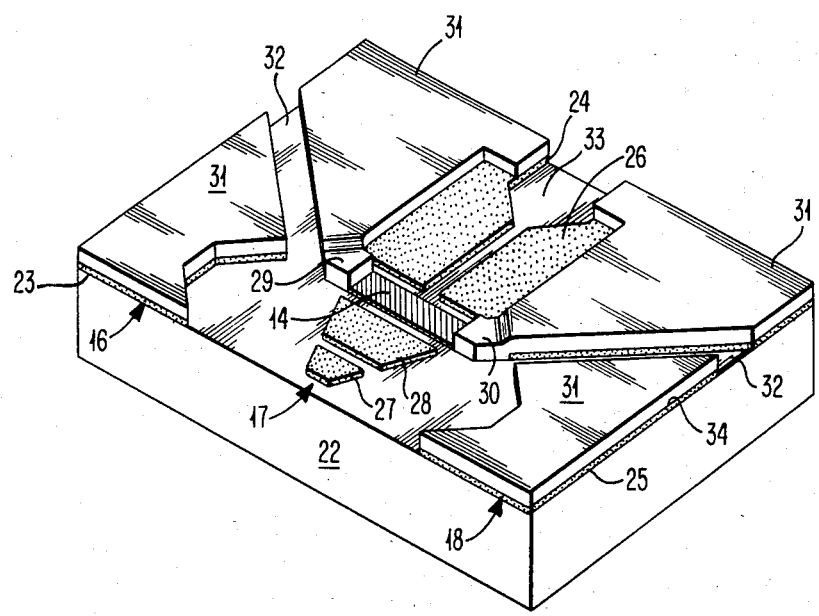
FIG. 6 shows the preferred construction of the magnetoresistive sensor in accordance with the present invention.

FIG. 6 shows a preferred construction of the sensor of our invention. The sensor of FIG. 6 includes a tape or stripe engaging face 22 and magnetoresistive element 14. Yoke portions 16 and 18 are provided by divided sections 23, 24, 25 and 26. The yoke portion 17 is provided by divided sections 27 and 28 and part of sections 24 and 26. The output signal is detected on output lines which are connected to the magnetoresistive sensor element 14 by a conductive path through gold conductive portions 29 and 30 of layers 31 of the device. Yoke sections 23 and 25 are separated by gaps 32 from adjacent yoke sections 24 and 26 to reduce migration of corrosion or contamination that could otherwise occur if the legs were maintained as a single unitary structure and to isolate the conductive portions 29 and 30 from the remainder of the gold layer 31. Gap 33 prevents the yoke from being a short circuit to the signal across contacts 29 and 30. Sections 27 and 28 of yoke portion 17 are separated so as to avoid migration of corrosion and contamination.

Both the magnetoresistive element 14 and the magnetically permeable yoke materials can be laid down in a planar structure so that manufacture is relatively easy. In the manufacture of the preferred embodiment of the invention a first layer 34 of NiFe alloy is evaporated onto the sapphire substrate 22. This NiFe layer is approximately 3000 angstroms thick. The preferred form of NiFe is an alloy which consists of approximately 19% Fe and 81% Ni. This material has a magnetostriction factor close to zero, low coercivity and low Barkhausen noise. An area larger than the sensing element 14 is then etched through this layer. A second layer of NiFe is then evaporated over the surface of the substrate 22. The second layer is approximately 300 angstroms thick. The thickness of the second layer determines the thickness of the magnetoresistive sensing element 14. The thickness of this second layer should be such that the element 14 will saturate before the yoke material saturates. Thus, if the yoke and element are of the same material this requires that the yoke should be substantially thicker than the element 14. The final pattern of the yoke sections and element 14 is then formed by sputter etching through both layers with a single mask to provide self-aligning of the magnetoresistive element 14 and yoke portions 24, 26 and 28. Sections 23 to 28 have the combined thickness of both layers of NiFe and the magnetoresistive element 14 has the thickness of only the second layer. Gold layer 31 is electroplated through an appropriate mask to protect the NiFe and to provide the electrical connections to the opposed ends of element 14. Because of the difference in thickness between the yoke sections 24 and 26 and the sensor element 14 the gold layer 31 is sloped in the areas where the contacts 29 and 30 connect to the gold layer 31 even though the contacts 29 and 30 and the layer 31 are all deposited in a single operation.

We claim:

1. In a magnetic reader for detecting binary flux transitions recorded on a surface of a magnetic media, a read head comprising:

a substantially planar magnetic resistive element mounted within said head so as to be perpendicular to the surface of said media when detecting said transitions, a magnetically permeable yoke disposed substantially coplanar with said magnetic resistive element, which together define a magnetic circuit, said yoke having at least one substantially coplanar leg portion providing a pole face adjacent said surface and being dimensioned to bridge over at least one flux transition adjacent to a second flux transition beneath said element when the plane of said element is skewed with respect to flux transitions on said surface, and providing a further substantially coplanar pole face positioned adjacent the edge of said element most distant from said surface to couple flux to said magnetoresistive element, and conductor means electrically connected to two spaced points on said magnetoresistive element for detecting any change in the electrical resistance thereof in response to a flux transition.

2. A magnetic reader as defined in claim 1, wherein said yoke has two substantially coplanar leg portions providing first and second pole faces adjacent said surface for extending over flux transitions to either side of a flux transition beneath said element.

3. A magnetic reader as defined in claim 2, wherein said yoke has a further substantially coplanar leg portion, positioned between said element and said surface, and providing a first additional pole face that overlies a transition beneath said element, and a second additional pole face that is positioned adjacent the edge of said element that is nearest to said surface.

4. A magnetic reader as defined in claim 1, wherein said yoke has a further substantially coplanar leg portion, positioned between said element and said surface, and providing a first additional pole face that overlies a transition beneath said element, and a second additional pole face that is positioned adjacent the edge of said element that is nearest to said surface.

5. A magnetic reader as defined in claim 1, wherein said magnetically permeable yoke has low coercivity and low Barkhausen noise.

6. A magnetic reader as defined in claim 1, further comprising:

an insulating substrate supporting said element, yoke and conductor means, said yoke being formed from a magnetically permeable layer on said substrate, configured to provide two outer leg portions and a central leg portion, each of said leg portions providing substantially coplanar pole faces adjacent said surface, said central leg portion being divided into two sections to provide said further pole face and an additional pole face spaced therefrom, and said magnetoresistive element comprising a magnetoresistive layer formed on said substrate in the space between said further pole face and said additional pole face.

7. A magnetic reader as defined in claim 1, for detecting magnetic flux transitions in a magnetic media, wherein:

said yoke comprises a magnetically permeable layer having two outer legs and an inner leg, said inner leg being divided into an upper and a lower portion, said magnetoresistive element is substantially coplanar with said yoke and mounted between said upper and lower portions of said inner leg, and said conductor means is connected to means for detecting changes in resistance in said magnetorestive element as said read head and said magnetic media are positioned adjacent one another to thereby detect the occurrence of said transitions.

8. A magnetic reader as defined in claim 7, wherein said outer legs of said yoke are sufficiently wide to extend over adjacent flux transitions on said magnetic media whenever the plane of said read head is skewed with respect to said flux transitions.

9. A magnetic reader as defined in claim 8, wherein each said outer leg portion is formed in at least two separate sections so that migration of corrosion or contamination through each leg portion is minimized.

10. A magnetic reader as defined in claim 1, wherein said magnetoresistive element and said yoke are formed of the same material and said yoke is substantially thicker than said magnetoresistive element.

* * * * *